(12) United States Patent
Iwama et al.

(10) Patent No.: US 11,462,894 B2
(45) Date of Patent: Oct. 4, 2022

(54) WIRE HARNESS

(71) Applicant: SUMITOMO WIRING SYSTEMS, LTD., Yokkaichi (JP)

(72) Inventors: Takuji Iwama, Yokkaichi (JP); Yuji Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/292,960

(22) PCT Filed: Nov. 15, 2019

(86) PCT No.: PCT/JP2019/044833
§ 371 (c)(1),
(2) Date: May 11, 2021

(87) PCT Pub. No.: WO2020/101011
PCT Pub. Date: May 22, 2020

(65) Prior Publication Data
US 2022/0006273 A1    Jan. 6, 2022

(30) Foreign Application Priority Data

Nov. 16, 2018 (JP) .............................. JP2018-215245

(51) Int. Cl.
*B60R 16/02* (2006.01)
*H01B 7/00* (2006.01)
(Continued)

(52) U.S. Cl.
CPC ....... *H02G 3/0481* (2013.01); *B60R 16/0207* (2013.01); *H01B 7/0045* (2013.01); *H02G 3/32* (2013.01)

(58) Field of Classification Search
CPC ............ B60R 16/0207; B60R 16/0215; H01B 11/1804; H01B 7/0045; H01B 7/16;
(Continued)

(56) References Cited

U.S. PATENT DOCUMENTS

2008/0257579 A1* 10/2008 Hirose .................. H01B 12/16
174/15.5
2017/0126084 A1* 5/2017 Schweinert ............ H02K 9/193
2018/0175596 A1   6/2018 Sugino

FOREIGN PATENT DOCUMENTS

| JP | S48-005191 B | 2/1973 |
| JP | 2012-197034 A | 10/2012 |
| JP | 2018-101462 A | 6/2018 |

OTHER PUBLICATIONS

Feb. 4, 2020 International Search Report issued in International Patent Application No. PCT/JP2019/044833.

* cited by examiner

*Primary Examiner* — Paresh Paghadal
(74) *Attorney, Agent, or Firm* — Oliff PLC

(57) ABSTRACT

A wire harness, including: a plurality of tubes that each include a tubular shape-retaining conductor having a conductive property and a shape-retaining property, the plurality of tubes being routed in parallel, wherein: a conductive tube, that includes an insulating cover that covers the shape-retaining conductor, is included among the plurality of tubes, and thicknesses of the shape-retaining conductors that are included in at least two tubes among the plurality of tubes are different to each other.

9 Claims, 6 Drawing Sheets

(51) Int. Cl.
*H02G 3/04* (2006.01)
*H02G 3/32* (2006.01)

(58) Field of Classification Search
CPC .. H01B 7/20–208; H01B 11/02; H01B 11/20;
H01B 11/206; H02G 3/04; H02G 3/0481;
H02G 3/32
See application file for complete search history.

WIRE HARNESS

BACKGROUND

The technique disclosed by the present specification relates to a wire harness.

Wire harnesses that are to be routed under the floors of vehicles such as hybrid vehicles, electric automobiles, and the like include high-voltage wires, which are to be connected to high-voltage batteries, low-voltage wires, which are to be connected to low-voltage batteries, and clamps for fixing the wires to the vehicle body. The high-voltage wires are inserted into metal pipes that have shielding properties. The metal pipes are bent by a pipe bender and routed to match the form of the vehicle. The low-voltage wires are inserted into resin tubes and are routed along the pipes for the high-voltage wires (see JP 2012-197034A).

SUMMARY

With the configuration described above, it is necessary to couple the flexible corrugated tubes to the metal pipes with the use of a plurality of parallel connection members so as not to hang down.

It is conceivable that the problem described above can be solved by using an electrically conductive member that is at least rigid enough to not hang down under its own weight when routed under the vehicle, instead of using the low-voltage wire. However, such a configuration requires the rigid electrically conductive member to be bent.

The diameter of the conductive body of the electrically conductive member needs to be selected in accordance with the current value of the current that is to flow therethrough. Also, the diameter of the metal pipe that holds the high-voltage wire therein also needs to be selected in accordance with the diameter of the high-voltage wire. If a wire harness includes a plurality of members that need to be bent and the diameters of these members are different to each other, there is concern that problems may arise such as the need to prepare a plurality of metal molds for bending, and the manufacturing process becoming complex.

A wire harness disclosed by the present specification includes a plurality of tubes that each include a tubular shape-retaining conductor having a conductive property and a shape-retaining property, the plurality of tubes being routed in parallel, wherein a conductive tube, that includes an insulating cover that covers the shape-retaining conductor, is included among the plurality of tubes, and thicknesses of the shape-retaining conductors that are included in at least two tubes among the plurality of tubes are different to each other.

With the configuration described above, it is possible to keep the difference in the outer diameters of the plurality of shape-retaining conductors within a certain range by making the thicknesses of the shape-retaining conductors different as necessary. Thus, it is possible to standardize the mold used with the pipe bender that is used to bend the plurality of tubes, and it is possible to simplify the process of manufacturing the wire harness.

In the configuration described above, at least one of the at least two tube may also be the conductive tube.

With the configuration described above, it is possible to appropriately set the thickness of the shape-retaining conductor that is included in the conductive tube in accordance with the size of the current that is to flow therethrough, while keeping the difference in the outer diameters of the shape-retaining conductors that are included in the plurality of tubes within a certain range.

One shape-retaining conductor among the shape-retaining conductors that are included in the at least two tubes may also have an outer diameter that is twice the size or less of an outer diameter of another one of the shape-retaining conductors.

Alternatively, the shape-retaining conductors that are included in the at least two tubes may also have outer diameters that are equal to each other.

In the configuration described above, a holder is further included that includes a plurality of holding portions that are configured to individually hold the plurality of tubes, wherein at least two tubes among the plurality of tubes may also have outer diameters that are equal to each other.

With the configuration described above, it is possible to simplify the process of manufacturing the wire harness because the configuration of the plurality of holding portions that hold the tubes in the holder can also be standardized, due to the outer diameters of the plurality of tubes being equal.

In the holding member described above, the plurality of holding portions may also be lined up in a row.

In this way, the plurality of holding portions are lined up in a row, and therefore the plurality of tubes that are held by the holder are also lined up in a row. The configuration described above is suitable for cases in which the wire harness is routed under the floor of a vehicle. This is because it is possible to reduce the amount by which the tubes and the holders move away from the body of the vehicle, and it is thus possible to avoid a situation in which the tubes come into contact with the surface of the ground.

The plurality of tubes may also include an insert tube in which a wire is to be inserted inside of the shape-retaining conductor.

In this way, effects that are similar to the effects described above can be exhibited even in a case where one tube is a shielding pipe for shielding a wire.

The wire harness disclosed by the present specification makes it possible to simplify the manufacturing process thereof.

DETAILED DESCRIPTION OF EMBODIMENTS

Figure 1:
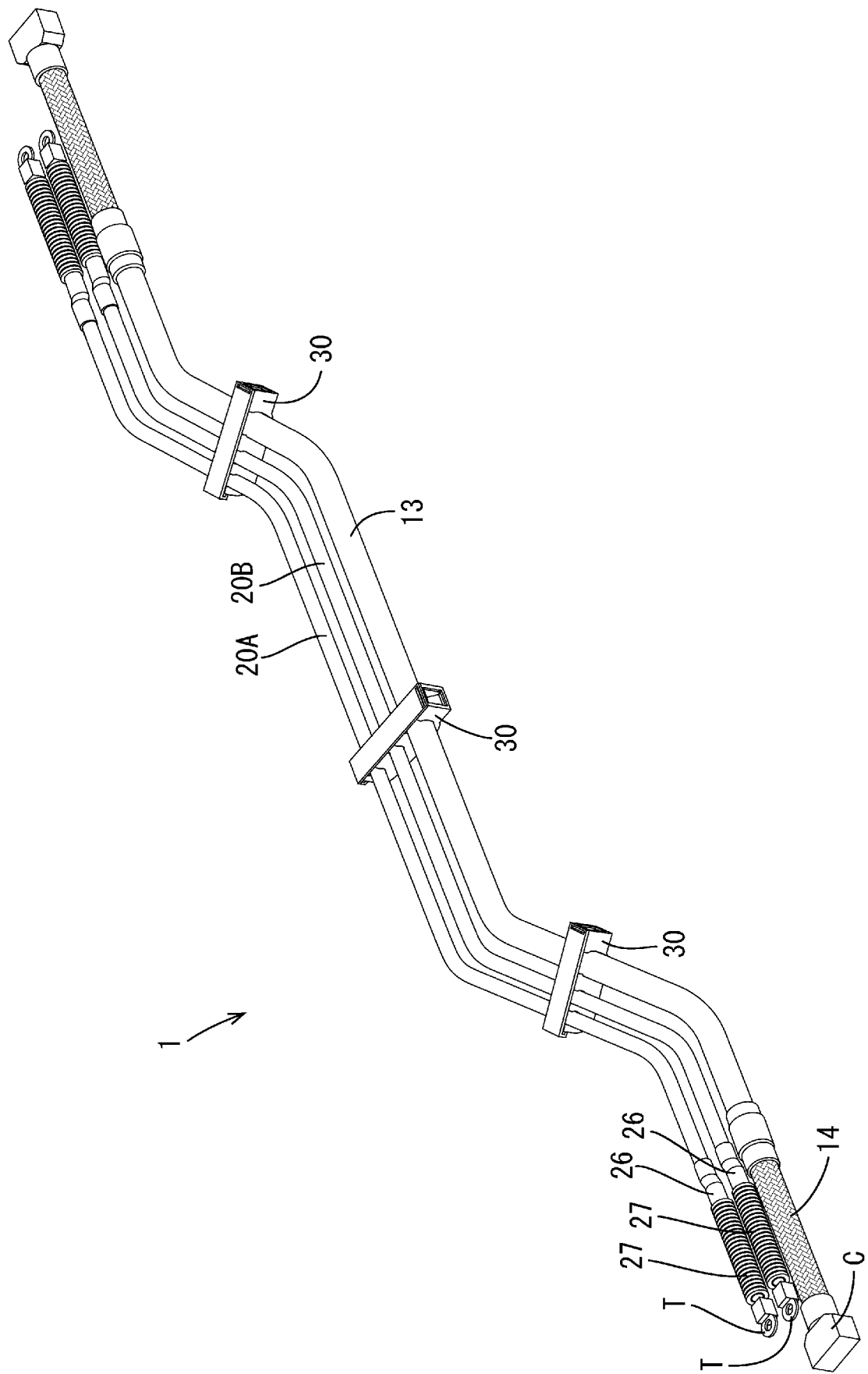
FIG. 1 is a perspective view of a wire harness of an embodiment.
Figure 3:
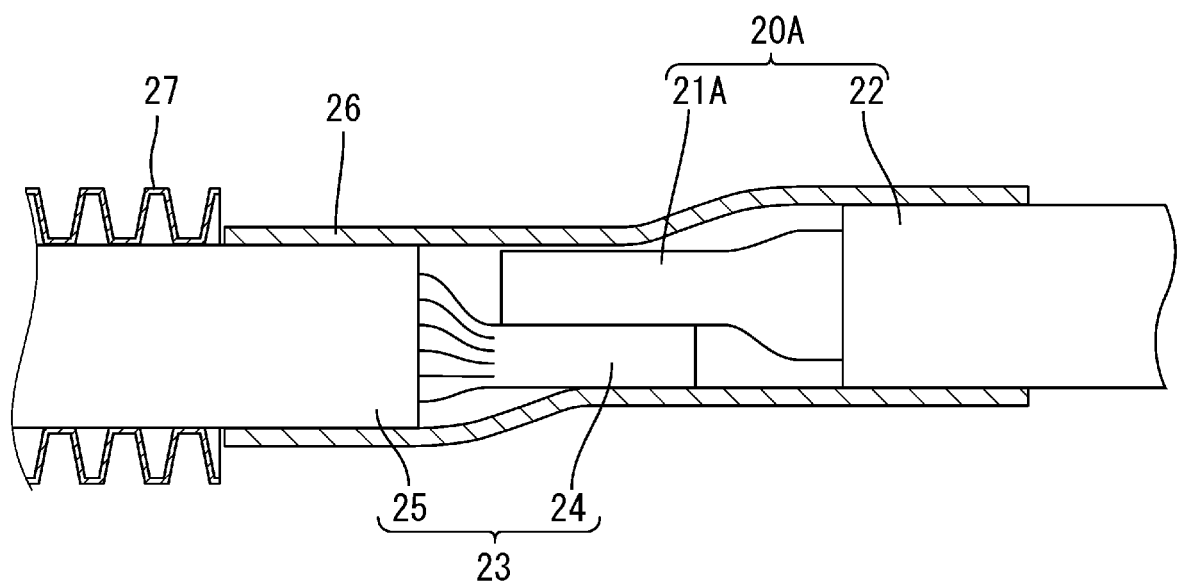
FIG. 3 is a partially enlarged sectional view showing a portion where a low-voltage tubular member and a connection wire are connected to each other in the embodiment.
Figure 4:
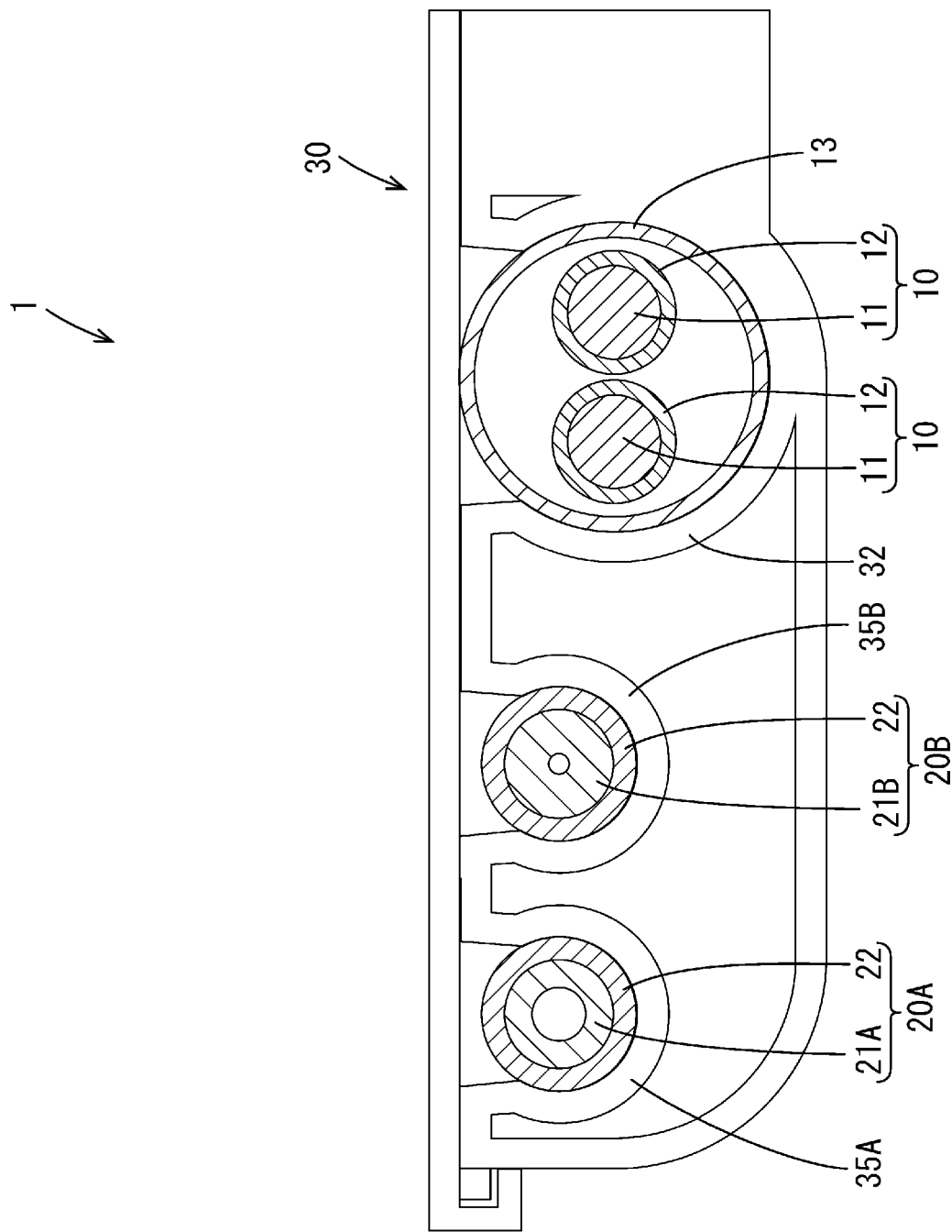
FIG. 4 is a sectional view showing a state in which the wire harness is fixed to a clamp in the embodiment.

An embodiment will be described with reference to FIGS. 1 to 6. As shown in FIGS. 1 and 4, a wire harness 1 of the present embodiment is routed in a vehicle such as an electric automobile or a hybrid vehicle and includes two high-voltage wires 10 (which equate to wires) that constitute a high-voltage circuit, a first low-voltage tubular member 20A (which equates to a tubular member/tube or a conductive tubular member/conductive tube) and a second low-voltage tubular member 20B (which equates to the tubular member/tube or the conductive tubular member/conductive tube) that constitute a low-voltage circuit, a pipe 13 (which equates to the tubular member/tube, an insert tubular member/insert tube, or a shape-retaining member/conductor) that accommodates the high-voltage wires 10 therein, and clamps 30 (which equate to holding members) that hold the pipe 13 and the low-voltage tubular members 20A and 20B.

Figure 2:
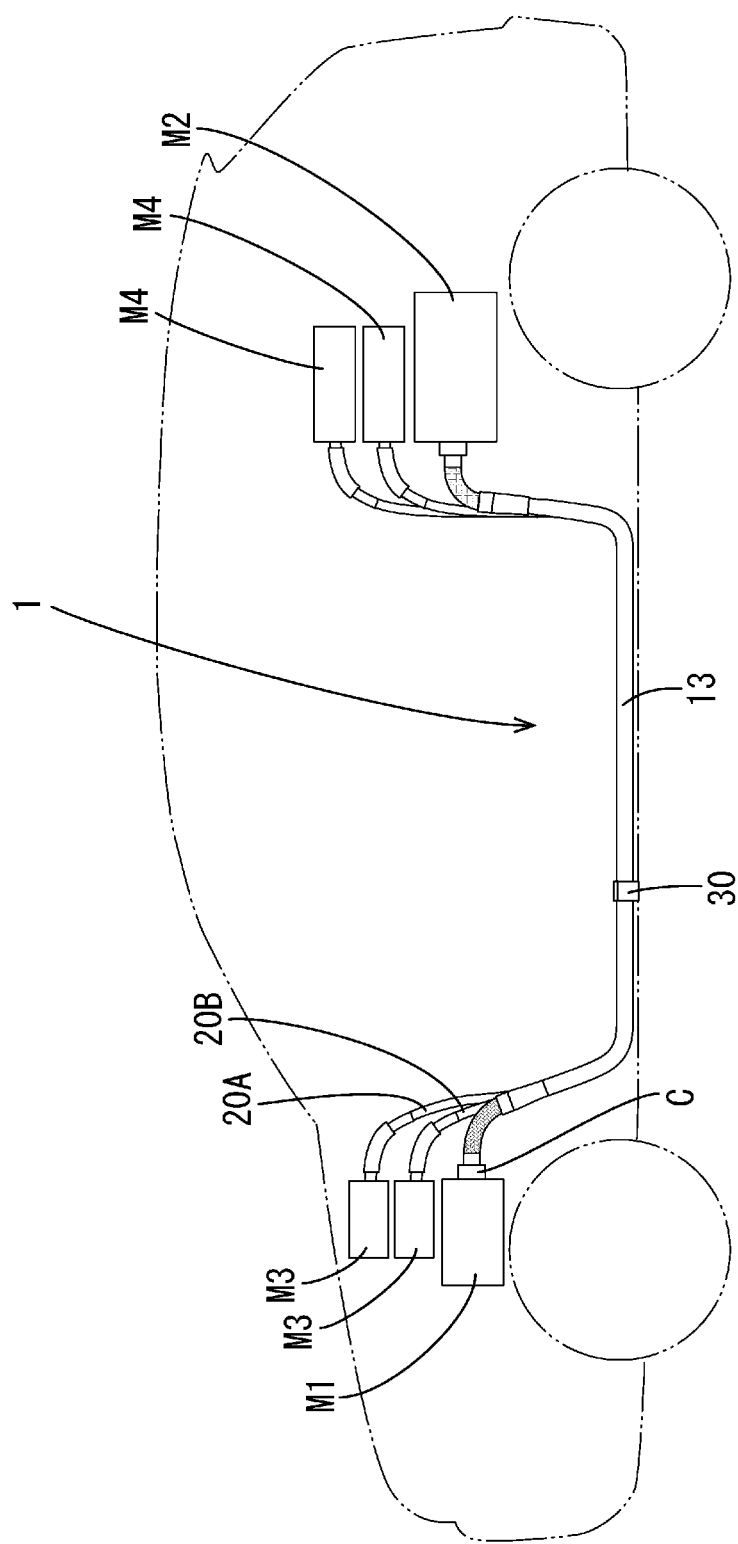
FIG. 2 is a schematic diagram showing a state in which the wire harness is routed in a vehicle in the embodiment.

As shown in FIG. 2, the high-voltage wire 10 connects a device M1, such as a motor inverter, that is installed in a front portion of the vehicle and a power source M2, such as a high-voltage battery, that is installed in a rear portion of the vehicle. The low-voltage tubular members 20A and 20B connect devices M3, such as a fuse boxes, that are installed in a front portion of the vehicle and power sources M4, such as low-voltage batteries, that are installed in a rear portion of the vehicle, and the low-voltage tubular members 20A and 20B serve as conduction paths for supplying power from the power sources M4 to the devices M3. Most of the wire harness 1 is routed under the floor of the vehicle.

As shown in FIG. 4, the plurality of high-voltage wires 10 are commonly-known wires that include flexible high-voltage conduction bodies 11, which may be constituted by stranded wires that are made by twisting together a plurality of metal wires, and high-voltage insulating covers 12 that are made of a synthetic resin and cover the high-voltage conduction bodies 11. The high-voltage wires 10 can handle high voltages and large currents. End portions of the high-voltage wires 10 are connected to terminal fittings (not shown), and the terminal fittings are accommodated in connectors C that can be connected to the device M1 and the power source M2.

The high-voltage wires 10 are inserted into the pipe 13 that has shielding properties and shape-retaining properties. The pipe 13 is a long tubular body made from a metal, and serves as a shield for the high-voltage wires 10 accommodated therein. The pipe 13 is constituted by, for example, copper, a copper alloy, aluminum, an aluminum alloy, or the like. The two high-voltage wires 10 are inserted together into the pipe 13, of which there is one. The pipe 13 is bent into a predetermined shape with the use of a pipe bender.

As shown in FIG. 1, both end portions of the pipe 13 are connected to shield members 14 in such a way as to allow conduction, and the shield members 14 have shielding properties and are flexible. The shield members 14 are braided members made by braiding fine metal wires into a tubular shape, metal tape, or the like. The shield members 14 have ends that are fastened to the pipe 13, and other ends that are connected to the connectors C. Electromagnetic noise produced by the high-voltage wires 10 is masked due to the pipe 13 and the shield members 14 covering the entire length of the high-voltage wires 10.

As shown in FIG. 4, the first low-voltage tubular member 20A includes a first shape-retaining conductive body 21A (which equates to a shape-retaining member/conductor) that is conductive and has shape-retaining properties, and a low-voltage insulating cover 22 (which equates to the insulating cover) that is made of a synthetic resin and covers the first shape-retaining conductive body 21A. Here, "shape-retaining properties" means that the shape-retaining member is at least rigid enough to not hang down under its own weight when routed under the vehicle. The first shape-retaining conductive body 21A is made of a metal such as copper, a copper alloy, aluminum, an aluminum alloy, or the like, and is a hollow, tubular member. The first shape-retaining conductive body 21A has a length that is equivalent to the length of the pipe 13.

The low-voltage insulating covers 22 are insulating tubes, shrinkable tubes, or the like that are made of a synthetic resin such as polypropylene or polyamide, and are thicker than common wire insulation, and one of the low-voltage insulating covers 22 is in areal contact with the first shape-retaining conductive body 21A.

Each end portion of the first low-voltage tubular member 20A is connected to a flexible connection wire 23. As shown in FIG. 3, the connection wire 23 is a commonly-known wire that includes a flexible connection conduction body 24, which may be constituted by a stranded wire that is made by twisting together a plurality of metal wires, and a connection insulating cover 25 that covers the connection conduction body 24. An end portion of the first shape-retaining conductive body 21A that is exposed from the low-voltage insulating cover 22 at the end portion of the first low-voltage tubular member 20A and an end portion of the connection conduction body 24 that is exposed from the connection insulating cover 25 at an end portion of the connection wire 23 are electrically connected to each other by a fastening means such as ultrasonic welding, soldering, or the like. As shown in FIG. 3, the portion where the first low-voltage tubular member 20A and the connection wire 23 are connected to each other is covered by a protective member 26 such as a shrinkable tube.

As shown in FIG. 3, the connection wire 23 is covered by a flexible exterior cladding member 27 such as a corrugate tube. The exterior cladding member 27 is fixed to the protective member 26 with the use of a fixing means (not shown) such as taping. As shown in FIG. 1, end portions of the connection wires 23 are connected to terminal fittings T that enable connection with the devices M3 and the power sources M4.

As shown in FIG. 4, the second low-voltage tubular member 20B includes a second shape-retaining conductive body 21B (which equates to a shape-retaining member/conductor), and one of the low-voltage insulating covers 22 (which equates to the insulating cover) that is made of a synthetic resin and covers the second shape-retaining conductive body 21B. The second shape-retaining conductive body 21B is a hollow, tubular member, has an outer diameter that is equal to the outer diameter of the first shape-retaining conductive body 21A, and has an inner diameter that is smaller than the inner diameter of the first shape-retaining conductive body 21A. That is to say, the second shape-retaining conductive body 21B is thicker than the first shape-retaining conductive body 21A. The low-voltage insulating covers 22 that are included in the two low-voltage tubular members 20A and 20B have similar configurations, and the outer diameters of the two low-voltage tubular members 20A and 20B are equal due to having equal thicknesses. The configurations of members such as the connection wires 23 that are connected to the second low-voltage tubular member 20B are similar to the configurations of the members connected to the first low-voltage tubular member 20A, and therefore similar configurations will use the same reference numerals and descriptions thereof will be omitted.

The sizes of the inner diameters of the first shape-retaining conductive body 21A and the second shape-retaining conductive body 21B can be set in accordance with the amounts of current that are to flow through the first low-voltage tubular member 20A and the second low-voltage tubular member 20B. That is to say, the thicknesses of the first shape-retaining conductive body 21A and the second shape-retaining conductive body 21B can be set in accordance with the amounts of current that are to flow through the first low-voltage tubular member 20A and the second low-voltage tubular member 20B.

The two low-voltage tubular members 20A and 20B are bent by a pipe bender so as to resemble the curved shape of the pipe 13. The first shape-retaining conductive body 21A and the second shape-retaining conductive body 21B have equal outer diameters, and the outer diameters of the two low-voltage tubular members 20A and 20B are also equal, and therefore it is possible to standardize the configuration of the metal mold of the pipe bender that is used to bend the two low-voltage tubular members 20A and 20B, and it becomes possible to generalize installations and improve efficiency of manufacturing.

Figure 5:
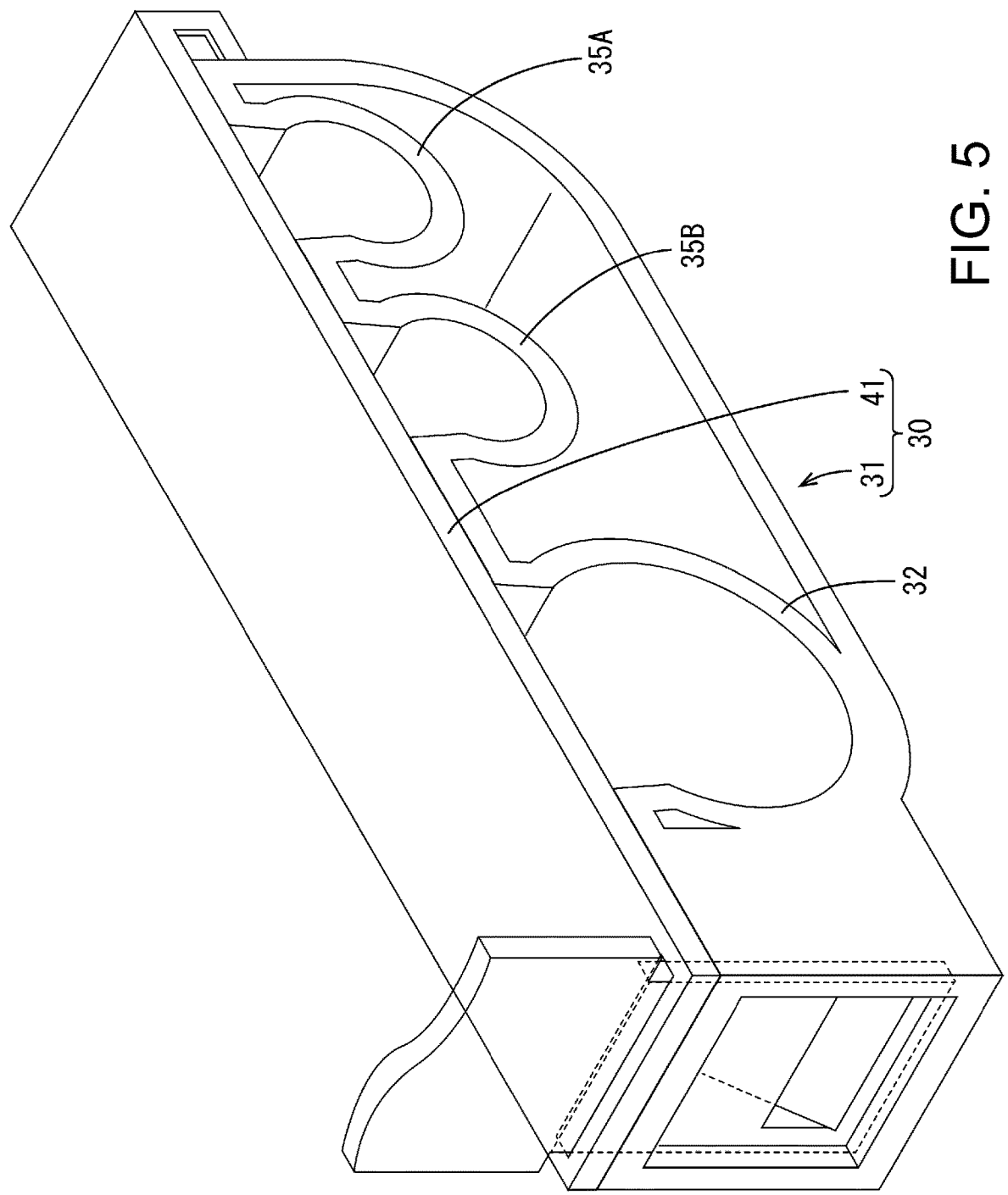
FIG. 5 is a perspective view of the clamp of the embodiment.
Figure 6:
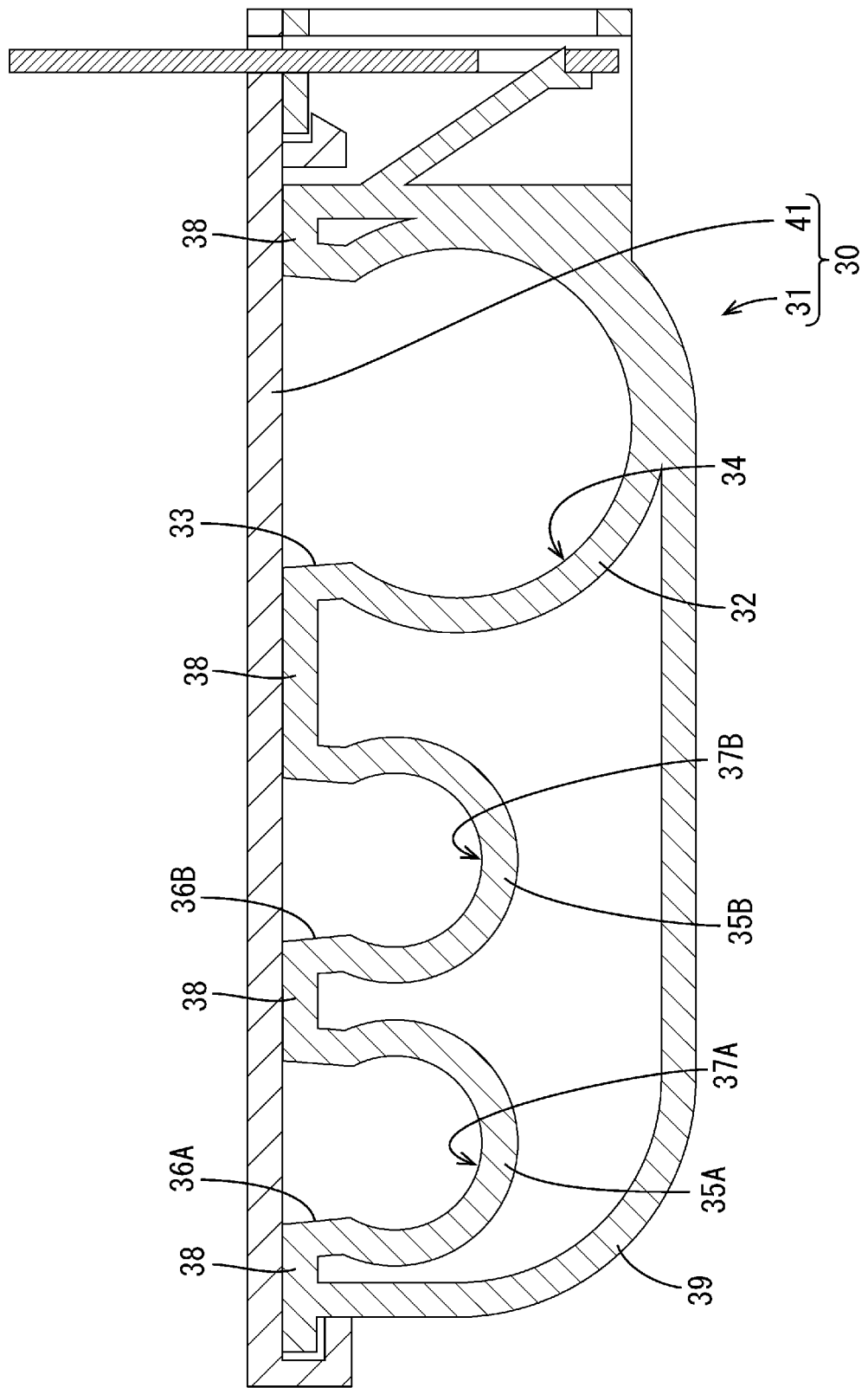
FIG. 6 is a sectional view of the clamp of the embodiment.

Each of the clamps 30 is made of a synthetic resin and, as shown in FIGS. 5 and 6, includes a body portion 31 and a lid portion 41. The body portion 31 includes a high-voltage line holding portion 32 that can hold the pipe 13, and two low-voltage line holding portions 35A and 35B (which equate to the holding portions) that can respectively hold the low-voltage tubular members 20A and 20B.

The high-voltage line holding portion 32 has a C-shaped ring shape that can accommodate the pipe 13 therein, and the cut-out portion of the C-shape is an entrance 33 for allowing the pipe 13 to enter. The high-voltage line holding portion 32 has an arc-shaped inner peripheral surface 34 having a shape and radius that resembles the outer peripheral surface of the pipe 13, and can tightly hold the pipe 13 therein.

The two low-voltage line holding portions 35A and 35B similarly have C-shaped ring shapes that can tightly hold the low-voltage tubular members 20A and 20B respectively therein, and the cut-out portions of the C-shapes are entrances 36A and 36B for allowing the low-voltage tubular members 20A and 20B to enter. The two low-voltage line holding portions 35A and 35B include arc-shaped inner peripheral surfaces 37A and 37B having shapes and radii that resemble the outer peripheral surfaces of the low-voltage tubular members 20A and 20B, and can tightly hold the low-voltage tubular members 20A and 20B respectively therein. The two low-voltage line holding portions 35A and 35B have the same shape, and can hold either of the two low-voltage tubular members 20A and 20B. The two low-voltage tubular members 20A and 20B have the same outer shape, and therefore it is possible to standardize the configuration of the plurality of low-voltage line holding portions 35A and 35B that hold the low-voltage tubular members 20A and 20B.

The entrances 33, 36A, and 36B are lined up in a row with spaces provided therebetween, and with the high-voltage line holding portion 32 and the two low-voltage line holding portions 35A and 35B facing the same direction (upward in FIG. 6). The high-voltage line holding portion 32 and the two low-voltage line holding portions 35A and 35B are lined up horizontally when fixed to the vehicle.

The body portion 31 includes an outer wall portion 39 that is shaped like the letter "U" and surrounds the high-voltage line holding portion 32 and the two low-voltage line holding portions 35A and 35B. The high-voltage line holding portion 32, the two low-voltage line holding portions 35A and 35B, and the outer wall portion 39 are joined to each other by joining walls 38.

The lid portion 41 is a member that is attached to the body portion 31 and that covers all of the three entrances 33, 36A, and 36B, and may be separate from the body portion 31 or be joined to the body portion 31 via a hinge or the like.

The following is an example of a process of manufacturing the wire harness 1 that is configured as described above.

First, a high-voltage conduction path is manufactured. The two high-voltage wires 10 are inserted into the pipe 13 and the pipe 13 is bent into a predetermined shape. The shield members 14 are placed over the portions of the high-voltage wires 10 that are led out of the pipe 13, and end portions of the shield members 14 on one side are fastened to an end portion of the pipe 13. The terminal fittings that are drawn out from the shield members 14 are accommodated in one of the connectors C, and end portions of the shield members 14 on the other side are fastened to the other connector C.

Next, the two low-voltage tubular members 20A and 20B are bent into a shape that resembles the curved shape of the pipe 13.

Next, the clamps 30 are attached to the pipe 13 and the low-voltage tubular members 20A and 20B. The lid portions 41 of the clamps 30 are removed, and the pipe 13 is fitted to the high-voltage line holding portions 32. Also, the two low-voltage tubular members 20A and 20B are respectively fitted to the low-voltage line holding portions 35A and 35B. Next, the lid portion 41 is attached to the body portion 31. Thus, the pipe 13 and the low-voltage tubular members 20A and 20B are fixed to the clamps 30.

As described above, the two low-voltage tubular members 20A and 20B have equal outer diameters, the two low-voltage line holding portions 35A and 35B have the same shape, and therefore the two low-voltage line holding portions 35A and 35B can hold either of the two low-voltage tubular members 20A and 20B. This eliminates the need to consider which of the two low-voltage tubular members 20A and 20B is to be attached to which of the two low-voltage line holding portions 35A and 35B during assembly, therefore avoid complicating the assembly process.

In a state of being held by the clamps 30 as shown in FIG. 4, the pipe 13 and the two low-voltage tubular members 20A and 20B are arranged parallel to each other with predetermined spaces provided therebetween.

This completes the process of manufacturing the wiring harness 1.

By the clamps 30 being fixed to the vehicle, most of the pipe 13 and the two low-voltage tubular members 20A and 20B except the end portions thereof are routed under the floor of the vehicle. As described above, in a state of being held by the clamps 30, the pipe 13 and the two low-voltage tubular members 20A and 20B are parallel to each other with predetermined spaces provided therebetween, and therefore by fixing the clamps 30 to the vehicle such that the pipe 13 and the two low-voltage tubular members 20A and 20B extend along the floor plate of the vehicle, it is possible to reduce the amount by which the low-voltage tubular members 20A and 20B and the clamps 30 move away from the body of the vehicle.

Both end portions of the pipe 13 are bent upwards and are led into the vehicle, and one of the connectors C is connected to the device M1, and the other connector C is connected to the power source M2. Both end portions of each of the two low-voltage tubular members 20A and 20B are similarily bent upwards and led into the vehicle, and the terminal fittings T on one side are connected to the devices M3, and the terminal fittings T on the other side are connected to the power sources M4.

According to the embodiment described above, the wire harness 1 includes the plurality of tubular low-voltage tubular members 20A and 20B, which include the tubular shape-retaining conductive bodies 21A and 21B that have conductive properties and shape-retaining properties, and the tubular pipe 13 having conductive properties and shape-retaining properties are line up in parallel, wherein the low-voltage tubular members 20A and 20B include low-voltage insulating covers 22 that cover the shape-retaining conductive bodies 21A and 21B, and the thicknesses of the shape-retaining conductive bodies 21A and 21B included in the low-voltage tubular members 20A and 20B are different to each other.

With the configuration described above, it is possible to keep the difference in the outer diameters of the plurality of shape-retaining conductive bodies 21A and 21B in a certain range by setting different thicknesses for the shape-retaining conductive bodies 21A and 21B according to the sizes of the currents that are to flow therethrough. In the present embodiment, the outer diameters of the plurality of shape-retaining conductive bodies 21A and 21B are equal. Thus, it is possible to standardize the mold used with the pipe bender that is used to bend the plurality of low-voltage tubular members 20A and 20B, and it is possible to simplify the process of manufacturing the wire harness 1.

Also, the wire harness 1 further includes the clamps 30 that include the plurality of low-voltage line holding portions 35A and 35B that are configured to individually hold the plurality of low-voltage tubular members 20A and 20B, wherein the plurality of low-voltage tubular members 20A and 20B have outer diameters that are equal to each other.

With the configuration described above, it is possible to reduce the costs of, and simplify the process of, manufacturing the wire harness 1 because the configuration of the plurality of low-voltage line holding portions 35A and 35B that hold the low-voltage tubular members 20A and 20B in the clamps 30 can also be standardized, due to the outer diameters of the plurality of low-voltage tubular members 20A and 20B being equal.

Also, the plurality of low-voltage line holding portions 35A and 35B are lined up in a row in the clamps 30.

With such a configuration, the low-voltage tubular members 20A and 20B can be lined up in one row. The configuration described above is suitable for cases in which the wire harness 1 is routed under the floor of a vehicle. This is because it is possible to reduce the amount by which the low-voltage tubular members 20A and 20B and the clamps 30 move away from the body of the vehicle, and it is possible to avoid a situation in which the low-voltage tubular members 20A and 20B come into contact with the ground surface.

Other Embodiments

The technique disclosed in the present specification is not limited to the embodiment described above with the description and the drawings, but includes various aspects such as the following.

(1) In the embodiment described above, the wire harness 1 includes two of the low-voltage tubular members 20A and 20B, but configurations are also possible in which one or three or more low-voltage tubular members are provided. Also, it is sufficient that the number of low-voltage line holding portions of the clamps matches the number of low-voltage tubular members.

(2) In the embodiment described above, the wire harness 1 includes two high-voltage wires 10, but configurations are also possible in which one or three or more high-voltage wires are included.

(3) In the embodiment described above, the connection wires 23 are connected to both end portions of the low-voltage tubular members 20A and 20B, but configurations are possible in which flexible wires, for example, are connected to only one end portion of the wires.

(4) In the embodiment described above, the shape-retaining conductive bodies 21A and 21B of the two low-voltage tubular members 20A and 20B have equal outer diameters, but the outer diameter of one of the shape-retaining members may be twice the size or less of the outer diameter of the other shape-retaining member, more preferably 1.5 times or less the size thereof, and even more preferably 1.2 times or less the size thereof. With such a configuration, it is possible to bend the plurality of tubular members with a pipe bender using the same metal mold. That is to say, it is possible to standardize the mold used with the pipe bender that is used to bend the plurality of tubular members, and it is possible to simplify the process of manufacturing the wire harness. Favorable processing was possible when shape-retaining members each having an outer diameter of 7 mm and shape-retaining conductive bodies each having an outer diameter of 13 mm were bent with the use of the same metal mold. Also, as the tubular members that include the insulating covers, favorable processing was possible when tubular members each having an outer diameter of 8 mm and tubular members each having an outer diameter of 12 mm were bent together.

(5) The tubular members are not limited to being conduction paths that constitute a low-voltage circuit. In the embodiment described above, the high-voltage circuit is constituted by the high-voltage wires 10, but the high-voltage circuit may also be constituted by tubular members.

(6) In the embodiment described above, the first shape-retaining conductive body 21A has the same length as the pipe 13, but there is no particular limitation on the relationship between the lengths of the plurality of shape-retaining conductive bodies.

(7) In the embodiment described above, the low-voltage tubular members 20A and 20B are subjected to bending, but configurations are also possible in which the tubular members are formed by covering the shape-retaining members with insulating covers after the bending, for example.

(8) In the embodiment described above, bending the two low-voltage tubular members 20A and 20B with a pipe bender using the same mold is made possible, but, for example, the thicknesses of the shape-retaining conductive bodies included in the conductive tubular members and the insert tubular members may also be different to each other. In such a case, the outer diameters of the shape-retaining conductive bodies may also be equal to each other.

Alternatively, the outer shape of the shape-retaining member that is included in the insert tubular member may also be twice the size or less of the outer shape of the shape-retaining members that are included in the conductive tubular members, and may also be 1.2 times or less the size thereof. In this way, it is possible to keep the difference in the outer diameters of the conductive tubular members and the insert tubular member within a certain range by making the thicknesses of the shape-retaining members that are included in the conductive tubular members and the insert tubular member different to each other depending on the usage thereof. Thus, it is possible to standardize the molds used with the pipe bender that is used to bend the conductive tubular members and the insert tubular member, and it is possible to simplify the process of manufacturing the wire harness.

(9) In the embodiment described above, the low-voltage insulating covers 22 that are included in the two low-voltage tubular members 20A and 20B have similar configurations, and the thicknesses thereof are equal, but the configurations thereof may also be different to each other, and the thicknesses thereof may also be different to each other.

(10) The first low-voltage tubular member 20A is also referred to as a first tubular member. The first shape-retaining conductive body 21A is also referred to as a first shape-retaining member. The low-voltage insulating cover 22 that covers the first shape-retaining conductive body 21A is also referred to as a first insulating cover.

(11) The second low-voltage tubular member 20B is also referred to as a second tubular member. The second shape-retaining conductive body 21B is also referred to as a second shape-retaining member. The low-voltage insulating cover 22 that covers the second shape-retaining conductive body 21B is also referred to as a second insulating cover.

The present disclosure encompasses embodiments described below. The reference numerals of representative components of representative embodiments are attached not for limitation but as an aid for understanding.

[Supplementary Note 1]

In one or more embodiments of the present disclosure, a wire harness (1) includes a first tubular member (20A) and a second tubular member (20B), where the first tubular member (20A) includes a first shape-retaining member (21A) having conductive properties and shape-retaining properties and includes a first insulating cover (22) that covers the first shape-retaining member (21A), and the second tubular member (20B) includes a second shape-retaining member (21B) having conductive properties and shape-retaining properties and includes a second insulating cover (22) that covers the second shape-retaining member (21B), and the thickness of the first shape-retaining member (21A) is different to the thickness of the second shape-retaining member (21B).

[Supplementary Note 2]

In one or more embodiments of the present disclosure, the outer diameter of the first shape-retaining member (21A) and the outer diameter of the second shape-retaining member (21B) are equal.

[Supplementary Note 3]

In one or more embodiments of the present disclosure, the outer diameter of the first tubular member (20A) and the outer diameter of the second tubular member (20B) are equal.

[Supplementary Note 4]

In one or more embodiments of the present disclosure, a holding member (30) is further included that has holding portions that individually hold the first tubular member (20A) and the second tubular member (20B).

[Supplementary Note 5]

In one or more embodiments of the present disclosure, the holding member (30) lines up the first tubular member (20A) and the second tubular member (20B) in a row so as to be side-by-side in a direction that intersects the lengthwise direction of the first tubular member (20A).

It will be clear to those skilled in the art that the disclosure may be embodied in other unique forms to the extent that those forms do not deviate from the technical idea thereof. For example, some of the components described in the embodiment (or one or more forms thereof) may be omitted, or some components may be combined. The scope of the present disclosure should be determined with reference to the appended claims, together with the full scope of the equivalents to which the claims entitle.

The invention claimed is:

1. A wire harness, comprising:
    a plurality of tubes that each include a tubular shape-retaining conductor having a conductive property and a shape-retaining property, the plurality of tubes being routed in parallel, wherein:
    at least two tubes among the plurality of tubes are conductive tubes, each of which includes an insulating cover that covers the shape-retaining conductor,
    thicknesses of the shape-retaining conductors that are included in the at least two tubes are different to each other, and
    thicknesses of the insulating covers that are included in the at least two tubes are the same.

2. The wire harness according to claim 1, wherein one shape-retaining conductor among the shape-retaining conductors that are included in the at least two tubes has an outer diameter that is twice a size or less of an outer diameter of another one of the shape-retaining conductors.

3. The wire harness according to claim 1, wherein the shape-retaining conductors that are included in the at least two tubes have outer diameters that are equal to each other.

4. The wire harness according to claim 1, further comprising
    a holder that includes a plurality of holding portions that are configured to individually hold the plurality of tubes, wherein
    at least two tubes among the plurality of tubes have outer diameters that are equal to each other.

5. The wire harness according to claim 4, wherein the plurality of holding portions in the holder are lined up in a row.

6. The wire harness according to claim 1, wherein the plurality of tubes includes an insert tube in which a wire is to be inserted inside of the insert tube, which is the shape-retaining conductor.

7. A wire harness, comprising:
    a first tube; and
    a second tube, wherein:
        the first tube includes a first shape-retaining conductor having a conductive property and a shape-retaining property, and a first insulating cover that covers the first shape-retaining conductor,
        the second tube includes a second shape-retaining conductor having a conductive property and a shape-retaining property, and a second insulating cover that covers the second shape-retaining conductor,
    the first shape-retaining conductor and the second shape-retaining conductor are hollow, circular tube-shaped members having inner diameters, and the inner diameter of the first shape-retaining conductor is different to the inner diameter of the second shape-retaining conductor,
    a thickness of the first shape-retaining conductor is different to a thickness of the second shape-retaining conductor, and
    a thicknesses of the first insulating cover is the same as a thickness of the second insulating cover.

8. The wire harness according to claim 7, wherein an outer diameter of the first shape-retaining conductor is equal to an outer diameter of the second shape-retaining conductor.

9. The wire harness according to claim 7, wherein an outer diameter of the first tube is equal to an outer diameter of the second tube.

* * * * *